Patented Dec. 26, 1939

2,184,316

UNITED STATES PATENT OFFICE 2,184,316

MINERAL FIBER BINDER

Jesse H. Plummer, Newark, Ohio, assignor, by mesne assignments, to Owens-Corning Fiberglas Corporation, a corporation of Delaware No Drawing. Application November 4, 1937, Serial No. 172,740

9 Claims. (Cl. 91—70)

The present invention relates to binders for mineral fibers more especially adaptable for relatively lightweight glass wool felt for use in pipe insulation, stove board, wall board, acoustical treatment, and the like.

It is particularly suitable for use in the manufacture of insulation for high temperature installation such as high pressure steam lines, stoves, furnaces, and the like.

An object of the invention is to produce a bonding material for mineral fibers, and more particularly glass wool felt which will withstand temperatures as high as 1200° F. without giving off objectionable odors or smoke, and without impairing its structural strength.

It is another object to produce a bonded product which does not require loading with heat resisting fillers in order to withstand high temperatures. Another object of the invention is to provide a bonded product which is strong, may be worked on to a moderate extent, may have ladders placed thereagainst, and may withstand the ordinary rigors of installation without material deterioration.

Various other objects and advantages of the present invention will become apparent from the following description.

Broadly considered, the invention contemplates a binder composed of a mixture of finely divided inorganic material such as plastic clay and an organic material capable of undergoing a pyrolytic reaction. In order to facilitate emulsification of the organics, a fine plastic clay, such as bentonite, is preferably used. Admixtures of other types of clay such as commercial ball clay or other ceramic clays, are also preferably added to stiffen the mass and to increase its compressive and general strength. Diatomaceous earth or similar finely divided material, may be used. For the binder, various types of organic material can be used including bituminous substances. The softer bitumens tend to produce tougher binders, although ordinarily the cheapest materials obtainable may satisfactorily be used, whether coal tar, petroleum asphalt, various organic sludges, or other still residues. A still residue under the trade name "Puresinol", largely aromatic, coming from Mid-Continent crudes, has been found to be highly satisfactory. The aromatic compounds are prominent among heat resisting organic compounds which is largely true for most of the materials suitable for this purpose. Various other organic materials capable of pyrolytic reaction, leaving resinous residues, may also be used, such as the carbohydrates, waxes, resins, fats, oils, or the like, of both the aliphatic and the aromatic types.

In practice I may use a mixture of one to seven parts bentonite, one to seven parts of other clay such as ball clay, and one to seven parts of organic matter. The proportions of ingredients may be varied as required by different types of materials to be produced. Sufficient bentonite, however, is preferably added to emulsify the organics which is accomplished by heating and passing through a colloid mill or similar apparatus. Generally this requires an equal amount of bentonite to organic, according to the particular type of organic used. Thus under ordinary conditions, the most desirable proportions of ingredients are equal portions of bentonite, organic and clay. Water may be added in amounts of 80 to 90 percent or thereabouts to produce a smooth, workable emulsion and to facilitate distribution of the binder over the fibers.

As noted hereinabove the combination of organic and inorganic materials, together with sufficient water or other dilutent, may be thoroughly intermixed in a colloid mill. It is also possible to mix together the organic and inorganic solid materials with a relatively small amount of water (30 to 40%), and mix them in a suitable power mixer such as a Banbury mixer, rolls, or simply a mixture such as is used for compounding lubricating grease. After such agitation and intermixture, the extra water may be added to produce consistency necessary for application. The water serves as an emulsifying agent and permits greater distribution of materials over the surface of the fibers and permits the binder to predominantly concentrate at the inner sections of the fibers.

This binder in emulsified state may then be applied to a fibrous mat of glass wool, either in board or sheet form, or in the form of a spirally wound mat adapted to be used for pipe covering. The densities of such mats are preferably relatively low as, for example, one to ten pounds per cubic foot, and then sufficient binder is applied thereto until the mat is fairly soaked with binder material. The binder may be applied by pouring or sprinkling on the mat, or inundating or dipping the fibrous mat into a bath of binder liquid. The excess may be drained off, leaving the binder distributed uniformly and completely over the individual fibers of the mat.

The fibrous board is then subjected to pyrolysis temperature which may be in the neighborhood of from 200° to 800° F. This may be accomplished in an oven through which hot air is passing to accelerate drying.

The time required for the action is a function of the temperature, the two being closely linked together and important.

Ordinarily the higher the temperature which is used, the tougher is the product produced, but it is essential to watch closely at the higher temperatures and remove shapes when pyrolysis has reached an optimum condition. At 800° F. the action of drying and pyrolysis takes generally from four and one-half to five hours. At 500° F. the actions are much slower, requiring many hours as, for example, about twelve to thirteen hours, to go from the wet state to the strong, tough state. If the product is left in the oven too long, it becomes brittle and hard and finally ignites and burns out.

I have found that it is very important to stop the process before the reactions proceed too far. It is highly advisable for the purpose of the present invention to prevent ignition of combustible material in order to avoid embrittlement of the mass. Accordingly I stop the reaction when maximum toughness has been reached. At lower temperatures, e. g., 600° F., the reactions proceed very slowly, requiring hours, where minutes may accomplish the same results at higher temperatures. In addition the nature of the reactions at the lower temperatures seems to be different from that at higher temperatures, the latter producing generally greater toughness. Therefore, I prefer to carry the temperatures as high as commercially feasible in drying ovens, taking pains to remove from the oven at the point of maximum toughness.

In performing this process, the presence of water vapor during the pyrolytic reaction contributes to inhibit combustion of the organic binder and also tempers the decomposition reactions, preventing them from going too far or to a point where they have excessively volatilized, whereby the production of a tough rather than brittle product is facilitated. Care should also be taken in practicing the invention to avoid excessive exothermic reaction in the interior of the product which would cause burning out in the interior of the product with a consequent increase in temperature which causes further combustion of the remainder of the material and consequent embrittlement. As a matter of fact, if ignition is begun and the conditions are favorable therefor, the entire mass may rapidly rise in temperature to excessive heights which I aim to avoid.

From another point of view, one of the objects of the reaction is to lose as little organic as possible, whether through ignition or distillation. Rather they should condense and polymerize on the surface of the fibers and more especially at the intersections of fibers to that degree giving maximum toughness.

Ordinarily for commercial uses a temperature of about 600° F. is best from the point of view of fan maintenance which is a problem in blowing hot air around or through the material in order to accelerate drying.

The reactions include dehydration secured by a variety of complex reactions. Oxygen appears to join on double bonds and combine with some hydrogen to form water and, at the same time, cross linkages appear to form. The final stage is splitting off more hydrogen to leave carbonaceous residues, and these are combination reactions. In between these two reactions heavy resinous molecules, largely aromatic in nature, are formed which withstand fairly high temperatures. When these condense on the clays, the latter are greatly reenforced and stabilized. In addition, there appears to be polymerization which seems to increase the toughness of the product.

The reactions, however, are so complex that it is difficult to determine exactly what takes place in every instance, although it has been found that the resultant product is extremely strong, tough, resistant to moisture, water-repellent, and light in density. If it is desired, however, to increase water repellency, various water repellent substances may be added such as waxes, metallic soaps, rosins, etc., although, of course, for higher temperature materials, it is desirable to use an agent which will not smoke or smell excessively. The density, of course, may be any value desired, but it is found that a density of about 8 to 15 pounds, and preferably about 12 pounds, is satisfactory, being contributed in part by the fibrous glass which may have a final density of about 4 to 8 pounds and about an equal amount of binder material.

The resultant product is also highly resistant to temperatures, and may be used on steam pipes or in stoves, ovens, etc., carrying temperatures of about 1000° to 1200° F. without subjecting them to material, if any, breakdown. Still higher temperatures, of course, may also be applied, but in this event the organic binder ignites and burns out, leaving only the inorganic binder.

Aluminum powder may also be added to the mass as a binding agent. The aluminum powder may replace part or all of the other ingredients including the organic material and the finely divided inorganics. The aluminum may be partially fused around the fibers owing to its melting temperature below that of the softening point of glass. When using aluminum, it is preferable to use a curly or crimped wool to impart sufficient flexibility to the mass.

Modifications and variations may be resorted to within the scope and spirit of the present invention as defined in the appended claims.

I claim.

1. The method of binding glass fibers in loose open formation which comprises incorporating a mixture of finely divided inorganic material chosen from the group consisting of clay, bentonite, aluminum, and diatomaceous earth in amounts sufficient to stiffen the mass, and a solid organic bituminous substance capable of pyrolytic reaction, and heating the mass to a point below the ignition temperature of the organic substance to cause a breakdown and resinification of the organic substance and the production of a hard tough product.

2. The method of binding glass fibers in loose open formation which comprises applying to the fibrous mass an aqueous emulsion of solid bituminous material and plastic clay, and then heating the mass to drive off the water and cause a toughening and hardening of the product.

3. The method of binding a light density fibrous bat of glass fibers in loose open formation which comprises applying an excess of an aqueous emulsion comprising bentonite and solid bituminous material, removing the excess emulsion, and then heating the mass to a pyrolyzing temperature not more than about 900° F. for a period of time insufficient to cause ignition and burning out of the organic material, but until the bituminous material has undergone a pyrolytic reaction and together with the bentonite has formed a strong tough binder.

4. A light density fibrous product comprising glass fibers in loose open formation, and a binder comprising finely divided inorganic material chosen from the group consisting of clay, bentonite, aluminum, and diatomaceous earth in amounts sufficient to stiffen the mass, and solid organic bituminous material which has undergone a pyrolytic reaction carried to a point short of combustion and ignition of the organic material, said binder being uniformly dispersed throughout the fibrous product over the individual fibers thereof.

5. A light density fibrous product comprising glass fibers in loose open formation, and a binder comprising plastic clay and solid organic bituminous material which has undergone a pyrolytic reaction carried to a point short of combustion and ignition of the organic material, said binder being uniformly dispersed throughout the fibrous product over the individual fibers thereof.

6. A light density fibrous product comprising an interfelted mass of fine mineral fibers, and a binder comprising a finely divided inorganic material chosen from the group consisting of clay, bentonite, aluminum, and diatomaceous earth in amounts sufficient to stiffen the mass, and a solid bituminous substance having been deposited uniformly over the fibers from an emulsion and undergone a pyrolytic reaction, producing a tough strong product in which the bituminous material is not burned out but condensed over the surface of the fibers, and which product is capable of withstanding temperatures up to about 800°–1000° F.

7. A fibrous product comprising interfelted mineral fibers in loose open formation, a binder comprising an aluminum powder and a bituminous material having undergone a pyrolytic reaction insufficient to cause combustion of the bituminous material although sufficient to cause a hardening and toughening of the mass.

8. The method of binding glass fibers in loose open formation which comprises incorporating a mixture composed of one to seven parts of finely subdivided inorganic material, and one to seven parts of a solid organic bituminous substance capable of pyrolytic reaction, and heating the mass to a point below the ignition temperature of the organic substance to cause a break down and resinification of the organic substance and the production of a hard tough product.

9. A light density fibrous product comprising glass fibers in loose open formation, and a binder comprising one to seven parts of finely divided inorganic siliceous material, and one to seven parts solid organic bituminous material which has undergone a pyrolytic reaction carried to a point short of combustion and ignition of the organic material, said binder being uniformly dispersed through the fibrous product over the individual fibers thereof.

JESSE H. PLUMMER.